United States Patent
Viethen

(10) Patent No.: US 9,945,473 B2
(45) Date of Patent: Apr. 17, 2018

(54) KICK-DOWN ELEMENT FOR A VEHICLE

(71) Applicant: Hella KGaA Hueck & Co., Lippstadt (DE)

(72) Inventor: Claus Viethen, Erwitte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 15/111,628

(22) PCT Filed: Jan. 7, 2015

(86) PCT No.: PCT/EP2015/050145
§ 371 (c)(1),
(2) Date: Jul. 14, 2016

(87) PCT Pub. No.: WO2015/110283
PCT Pub. Date: Jul. 30, 2015

(65) Prior Publication Data
US 2016/0334009 A1    Nov. 17, 2016

(30) Foreign Application Priority Data

Jan. 21, 2014  (DE) ........................ 10 2014 100 613

(51) Int. Cl.
*G05G 1/30* (2008.04)
*G05G 5/03* (2008.04)
(Continued)

(52) U.S. Cl.
CPC .............. *F16H 59/20* (2013.01); *G05G 1/42* (2013.01); *G05G 5/03* (2013.01); *G05G 1/30* (2013.01)

(58) Field of Classification Search
CPC . F16H 59/20; G05G 1/30; G05G 1/42; G05G 5/03; B60K 26/021; Y10T 74/20636
See application file for complete search history.

(56) References Cited

U.S. PATENT DOCUMENTS 6,394,431 B1    5/2002  Smith
6,446,500 B1 *  9/2002  Marquardt ............... G05G 1/44
                                                                73/132

(Continued)

FOREIGN PATENT DOCUMENTS

DE    10 2008 054626         6/2010
EP         1129884 A2 *     9/2001    ........... B60K 26/021
(Continued)

OTHER PUBLICATIONS

Machine translation of FR 2983791 A1 obtained on Aug. 30, 2017.*
Machine translation of JP 2013-004187 A obtained on Aug. 30, 2017.*

*Primary Examiner* — Adam D Rogers
(74) *Attorney, Agent, or Firm* — Husch Blackwell LLP

(57) ABSTRACT

A kick-down element for a vehicle, complete with a housing, an actuator that is fastened in the housing such that it can be moved axially and a force surge element that can be moved axially in the actuator and which is axially loaded by an elastic element. There is a plate-shaped protruding part on at least one housing panel, which runs perpendicular to the movement direction and the upper end of which runs diagonally downward. The force step element interacts with at least one roller, which is located between the protruding part and a wedgeshaped (9) of the force surge element in a resting position. The kick-down element is intended to allow for a relatively long travel path for the actuator in the most compact design possible. This is achieved by keeping the roller attached to a lower end of the actuator.

7 Claims, 2 Drawing Sheets

(51) Int. Cl.
  *F16H 59/20*    (2006.01)
  *G05G 1/42*    (2008.04)

(56) References Cited

U.S. PATENT DOCUMENTS

| | | | |
|---|---|---|---|
| 7,066,049 B2 * | 6/2006 | Reimann | B60K 26/02 73/132 |
| 8,376,098 B2 * | 2/2013 | Campbell | B60K 26/021 188/265 |
| 9,487,198 B2 * | 11/2016 | Kim | B60T 8/409 |
| 9,513,656 B2 * | 12/2016 | Stewart | G05G 5/03 |
| 2005/0097980 A1 | 5/2005 | Menzies | |

FOREIGN PATENT DOCUMENTS

| | | | | |
|---|---|---|---|---|
| EP | 1917153 | | 5/2008 | |
| FR | 2983791 | A1 * | 6/2013 | B60K 26/021 |
| JP | H0673834 | | 10/1994 | |
| JP | 2007095420 | A * | 4/2007 | |
| JP | 2013004187 | A * | 1/2013 | B60K 26/02 |
| WO | WO-2007020163 | A1 * | 2/2007 | B60K 26/02 |

* cited by examiner

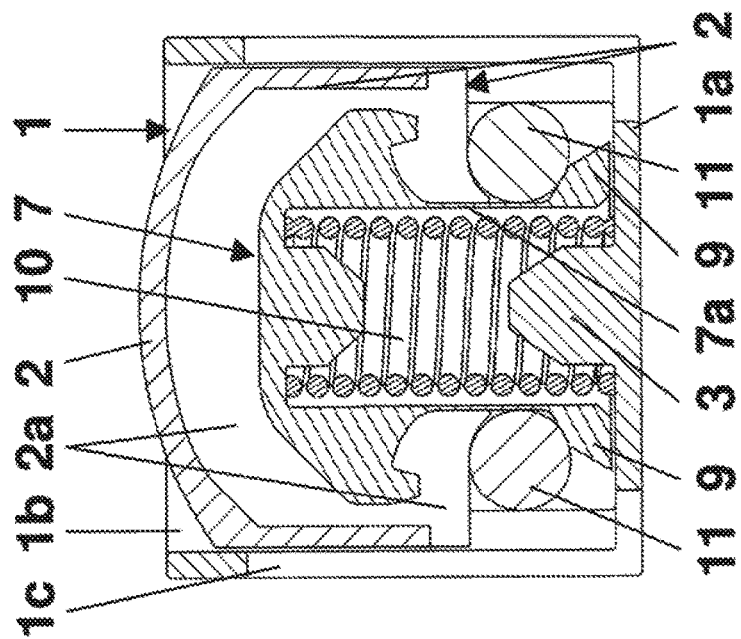
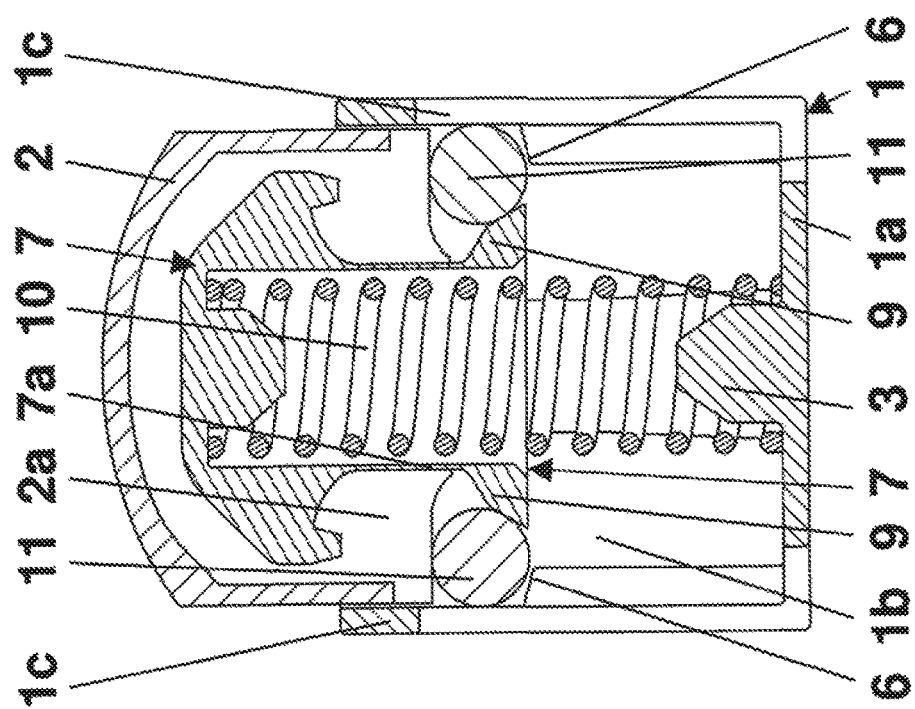

KICK-DOWN ELEMENT FOR A VEHICLE

CROSS REFERENCE

This application claims priority to PCT Patent Application No. PCT/EP2015/050145, filed 7 Jan. 2015, which itself claims priority to German Application No. 10 2014 100613.5, filed 21 Jan. 2014, the entirety of both of which are hereby incorporated by reference.

FIELD OF THE INVENTION

This invention is a kick-down element for a vehicle, complete with housing, an actuator that is fastened in the housing such that it can be moved axially and a force step element that can be moved axially in the actuator and which is axially loaded by an elastic element. There is a plate-shaped protruding element on at least one housing panel, which runs perpendicular to the movement direction and the upper end of which runs diagonally downward. The force step element interacts with at least one roller, which is located between the protruding part and a wedge-shaped extension of the force step element in a resting position. One part of the plate-shaped protruding part is formed together with the associated housing panel, and the plate is parallel to this. As a result, the protruding part extends into the housing diagonally.

BACKGROUND OF THE INVENTION

These types of kick-down elements are, in themselves, known. They are used in vehicles with automatic transmission to send a haptic signal to the driver's foot via a force step as soon as the accelerator pedal reaches or exceeds the pedal's kick-down position when the driver actuates the pedal sensor. This kick-down element does not boast any electrical functions and also does not have any direct influence on the transmission. The transmission switching function is controlled by other electrical/electronic components in the pedal sensor.

For certain applications, the kick-down element must exhibit a long excess path. This means that after the force step, a relatively long pedal path (travel path) is enabled in the full throttle direction. To achieve this, a relatively long travel path must be enabled for the actuator in the housing.

EP 1 917 153 B shows a kick-down element housed in the lever arm of a pedal. The equipment includes an actuator housed in a notch of the pedal such that it can be moved. The actuator contains a wedge that is pre-tensioned by a spring and interacts with the actuator through the rollers. Rollers on one side are housed in the transverse grooves of the pedal and on the other side in radial clearance holes inset in the actuator panels. When the actuator is enabled, the rollers are pressed out of the transverse grooves and against the wedge surface, which generates the desired force step. The actuator only allows for a short travel path within the notch.

SUMMARY OF THE INVENTION

The purpose of this invention is to create a kick-down element in the most compact design possible that allows for a relatively long travel path for the actuator.

The roller is also attached at the lower end of the actuator. This leaves a relatively long travel path during actuation after the force step until the actuator reaches a limit stop or the lower end reaches the base of the housing. This makes the versatile kick-down element ideal for various travel path distances, and it can be used in components such as pedals.

In one configuration, two rollers are arranged and allocated to housing panels across from them. This means that any load placed on the kick-down element is symmetrical, which prevents parts from jamming and increases the service life.

In another configuration, the wedge-shaped extension of the force step element can be used at two different gradients. This increases operational safety of the kick-down element and reduces friction during operation.

In a third configuration, the elastic element is a coil spring. This spring can be delivered with various suspension rates, so that the force step amount can be defined from this value. In addition, the elasticity of coil springs remains constant over the long term.

In a fourth configuration, the kick-down element is designed as a separate component for universal use. Here, the use of different elastic elements means that the kick-down elements can be manufactured with different force step levels for use in different vehicles.

In a fifth configuration, the movement range (travel path) of the actuator is 0 mm to 12 mm. As a result, the accelerator pedal can be pressed down further after the force step. If a short travel path is required, an appropriate mechanical lock can be installed in the housing.

In a sixth configuration, a mandrel is attached at the base of the housing, where the elastic element is also located. This ensures that the elastic element always remains precisely aligned and prevents it from kinking. This all ensures that the predefined elastic force and the force step amount are maintained.

In a seventh configuration, ribs and corresponding guide grooves are arranged on the housing and the actuator. This ensures that the actuator is safely stored in the housing. The actuator is also prevented from tipping over in the housing; this is particular important for preventing a double force step when using two rollers.

In a seventh configuration, a pot-like protuberance facing outward is inset in the base. This allows springs to be used without blocking the travel path. When pressed together, these springs create a relatively long path.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a vertical cut through of a kick-down element, not actuated.

FIG. 2 is a vertical cut through the kick-down element, actuated.

DETAILED DESCRIPTION OF THE DRAWINGS

Figure 3:
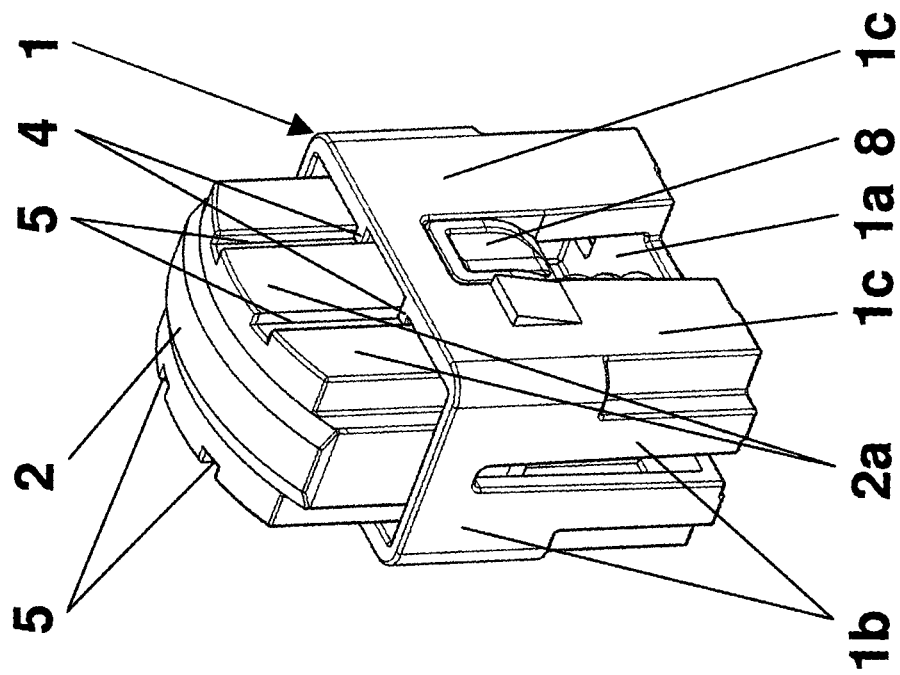
FIG. 3 is a perspective view of the kick-down element

As you can see in FIGS. 1 to 3, a kick-down element is comprised of a housing 1, in which an actuator 2 is housed such that it can be moved axially.

"Axial" in this context means parallel to a longitudinal axis of the kick-down element.

The housing 1 is mostly cube-shaped, is comprised of one base 1a and four housing panels 1b, 1c and is open at the top. A mandrel 3 is located in the interior center of base 1a. This mandrel extends vertically (axially) across a distance about half the height of the housing 1. Openings are inset in housing panels 1b, 1c that extend from base 1a across a predetermined distance parallel to the longitudinal axis of the housing 1. The openings reduce the amount of material needed and the weight and also hold snap-in elements 8 of the actuator 2 on at least two of the housing panels 1b, 1c. Two axial ribs 4 each are designed in at least two lengthwise housing panels 1b across from one another. The upper interior of each lengthwise housing panel 1c of the housing 1 contains a protruding part 6 that runs parallel to the base 1a. The protruding part extends across a predetermined distance between the lengthwise housing panels 1b and is parallel to the top of the lengthwise housing panel 1c. The protruding part 6 runs diagonally down towards the base 1a in the shape of a plate that is adequately shaped within the widthwise housing panel 1c and parallel to it all the way to the base 1a. The plate and protruding part 6 extend through the associated opening.

Locking tabs are arranged on the exterior of housing 1 to fix the kick-down element in an accelerator pedal or, with the same effect, to the body of a vehicle.

The actuator 2 is also mostly cube-shaped and dimensioned such that it is housed in the housing 1 so it can be moved axially with little play. An exclusion in the actuator 2 at the top across from the base 1a is rounded in a bow shape. Guide grooves 5 that correspond to the ribs 4 are inset in the exterior of the side panels; in this case, lengthwise sides 2a of the actuator 2. The snap-in elements 8 are arranged in a lower end area of both lengthwise sides 2a between the guide grooves 5.

Alternatively, the ribs 4 are arranged on the actuator 2 and there are guide grooves 5 on housing 1.

A force step element 7 is housed in actuator 2 such that it can be moved axially with little play. Force step element 7 features a shaft (neck portion) 7a with a rectangular cross section housed in actuator 2 with little play. One wedge-shaped extension 9 each is attached to two opposite sides on the lower end of the force step element 7. Each of these extensions is allocated to one of the protruding parts 6. Extension 9 can be used at two different gradients. A wedge surface connected directly to shaft 7a is less steep than the other wedge surface; for example, the angle between shaft 7a and the less steep wedge surface may be 125° and the angle between shaft 1a and the other wedge surface would be 135°. A downward facing blind bore hole with a circular cross section is inset in the force step element 7 in order to hold an elastic element, in this case a coil spring 10.

The coil spring 10 is still stored on the mandrel 3 in the housing 1.

Two rollers 11 (cylinders with circular cross sections) are arranged in the kick-down element. Two rollers 11 (cylinders with circular cross sections) are arranged in the kick-down element. Each of the rollers 11 seizes in the resting position and is pretensioned between the remaining wedge surface, the protruding part 6, the widthwise housing panel 1c and the lower end of the actuator 2 by the coil spring 10. Here, the rollers 11 are across from each other and the force step element 7 is arranged between the two rollers 11.

With the exception of the coil spring 10, the entire kick-down element is manufactured from plastic.

Actuating the kick-down element presses the actuator 2 into the housing 1. Since the rollers 11 are tensioned as described above, they have to be pushed inward away from the protruding parts 6 at the precise moment of actuation.

This is made possible by the fact that the rollers 11 use the wedge surfaces of the extensions 9 to press the force step element 7 down towards the base 1a relative to the actuator 2. The desired force step is achieved by the sudden movement of the rollers 11. After triggering the force surge, the actuator 2 can be pressed down by a specified travel length (travel path) into the housing 1. Here, both the force from the coil spring 10 and the usual pedal force must be overcome.

When the kick-down element is released, the coil spring 10 pushes force step element 7 (and the actuator 2 via the rollers 11) upward until the force step element 7, the actuator 2 and the rollers 11 have all reached their resting positions. The snap-in elements 8 of the actuator 2 determine these resting positions.

The invention claimed is:

1. A kick-down element for a vehicle, comprising:
   a housing,
   an actuator that is fastened in the housing such that the actuator can be moved in an axial direction,
   a force step element that can be moved axially in the actuator and which is axially loaded by an elastic element, the force step element including an upper portion, a wedged-shaped extension located below the upper portion of the force step element and the wedge-shaped extension having an upper portion and a lower portion, and a neck portion located between the upper portion of the force step element and the upper portion of the wedge-shaped extension, wherein the neck portion has a diameter smaller than a diameter of the wedge-shaped extension and the upper portion of the force step element;
   a protruding part on at least one housing panel of said housing, said protruding part running perpendicular to the axial direction, the protruding part including an upper end of which runs diagonally downward;
   wherein in a resting position, the force step element interacts with at least one roller, which is located between the protruding part and the upper portion of the wedge-shaped extension of the force step element, and
   wherein in an actuated position, the lower portion of the wedge-shaped extension of the force step element reaches to proximate a base of the housing and the at least one roller abuts the neck portion of the force step element.

2. The kick-down element in accordance with claim 1, wherein the at least one roller includes two rollers.

3. The kick-down element in accordance with claim 1 wherein the wedge-shaped extension of the force step element can be used at two different gradients.

4. The kick-down element in accordance with claim 1 wherein the elastic element is a coil spring.

5. The kick-down element in accordance with claim 1 wherein a movement range of the actuator is 0 mm to 12 mm.

6. The kick-down element in accordance with claim 1 wherein a mandrel is attached to the base of the housing, where the elastic element is also located.

7. The kick-down element in accordance with claim 1 wherein ribs are attached to the housing, and corresponding guide grooves are formed on the actuator.

* * * * *